United States Patent
Smegal et al.

(10) Patent No.: US 11,325,108 B2
(45) Date of Patent: *May 10, 2022

(54) HYDROPROCESSING CATALYST COMPOSITION CONTAINING A HETEROCYCLIC POLAR COMPOUND, A METHOD OF MAKING SUCH A CATALYST, AND A PROCESS OF USING SUCH CATALYST

(71) Applicant: Shell Oil Company, Houston, TX (US)

(72) Inventors: John Anthony Smegal, Houston, TX (US); Alexei Grigorievich Gabrielov, Houston, TX (US); Ed Ganja, The Woodlands, TX (US); Theofiel Meuris, Magnolia, TX (US)

(73) Assignee: SHELL USA, INC., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/291,144

(22) Filed: May 30, 2014

(65) Prior Publication Data

US 2014/0353213 A1  Dec. 4, 2014

Related U.S. Application Data

(60) Provisional application No. 61/829,689, filed on May 31, 2013.

(51) Int. Cl.

| | | |
|---|---|---|
| *B01J 27/19* | (2006.01) | |
| *B01J 31/02* | (2006.01) | |
| *C10G 45/08* | (2006.01) | |
| *B01J 37/02* | (2006.01) | |
| *B01J 35/00* | (2006.01) | |
| *B01J 23/85* | (2006.01) | |
| *B01J 37/18* | (2006.01) | |
| *B01J 37/20* | (2006.01) | |
| *B01J 21/04* | (2006.01) | |
| *B01J 35/10* | (2006.01) | |

(52) U.S. Cl.
CPC ............... *B01J 27/19* (2013.01); *B01J 23/85* (2013.01); *B01J 31/0204* (2013.01); *B01J 31/0209* (2013.01); *B01J 31/0247* (2013.01); *B01J 35/0006* (2013.01); *B01J 37/0203* (2013.01); *C10G 45/08* (2013.01); *B01J 21/04* (2013.01); *B01J 35/0026* (2013.01); *B01J 35/1019* (2013.01); *B01J 35/1042* (2013.01); *B01J 35/1061* (2013.01); *B01J 37/18* (2013.01); *B01J 37/20* (2013.01); *B01J 2231/60* (2013.01)

(58) Field of Classification Search
CPC ........ B01J 21/04; B01J 2231/60; B01J 23/85; B01J 27/19; B01J 31/0209; B01J 31/0247; B01J 35/0006; B01J 35/0026; B01J 35/1019; B01J 35/1042; B01J 35/1061; B01J 37/0203; B01J 37/18; B01J 37/20
See application file for complete search history.

(56) References Cited

U.S. PATENT DOCUMENTS

| | | |
|---|---|---|
| 3,959,179 A | 5/1976 | Mikovsky et al. |
| 5,338,717 A | 8/1994 | Aldridge et al. |
| 6,540,908 B1 | 4/2003 | Eijsbouts et al. |
| 6,872,678 B2 | 3/2005 | Eijsbouts |
| 8,262,905 B2 | 9/2012 | Gabrielov et al. |
| 2008/0087577 A1* | 4/2008 | Cholley ............... B01J 23/94 208/112 |
| 2010/0236988 A1* | 9/2010 | Gabrielov ............ B01J 23/75 208/217 |
| 2010/0243530 A1* | 9/2010 | Marchand .......... B01J 23/883 208/141 |
| 2012/0168350 A1 | 7/2012 | Mironov et al. |
| 2013/0005566 A1 | 1/2013 | Gillespie |

FOREIGN PATENT DOCUMENTS

| | | |
|---|---|---|
| KZ | 23413 A4 | 12/2010 |
| RU | 2310639 C2 | 11/2007 |

* cited by examiner

*Primary Examiner* — Renee Robinson
(74) *Attorney, Agent, or Firm* — Shell USA, Inc.

(57) ABSTRACT

A composition that comprises a support material having incorporated therein a metal component and impregnated with an additive compound that is selected from the group of heterocyclic, polar compounds of the formula $C_xH_nN_yO_z$; wherein: x is an integer of at least 3; y is either 0, 1, 2, or 3; z is either 0, 1, 2, or 3; and n is the number of hydrogen atoms required to fill the remaining bonds with the carbon atoms of the molecule. The composition includes the support material that is impregnated with the additive compound and is useful in the hydroprocessing of hydrocarbon feedstocks, especially in the denitrogenation and desulfurization of distillate feedstocks to make ultra low sulfur diesel.

11 Claims, 4 Drawing Sheets

HYDROPROCESSING CATALYST COMPOSITION CONTAINING A HETEROCYCLIC POLAR COMPOUND, A METHOD OF MAKING SUCH A CATALYST, AND A PROCESS OF USING SUCH CATALYST

This non-provisional application claims the benefit of U.S. Provisional Application No. 61/829,689, filed May 31, 2013.

This invention relates to a hydroprocessing catalyst composition that includes a heterocyclic compound in addition to its support material and metal components, a method of making such a hydroprocessing catalyst composition, and its use in the catalytic hydroprocessing of hydrocarbon feedstocks.

As a result of the very low sulfur concentration specifications for diesel fuels, there has been a great effort by those in industry to find new hydrotreating catalyst formulations and products that may be used in the manufacture of low-sulfur diesel and other products.

One catalyst taught by the art for use in the hydrotreating of certain hydrocarbon feedstocks so as to meet some of the more stringent sulfur regulations is disclosed in U.S. Pat. No. 5,338,717. In this patent, a hydrotreating catalyst is disclosed that is made by impregnating a Group VI (Mo and/or W) heteropolyacid onto a support followed by treating the impregnated support with an aqueous solution of a reducing agent that may be dried and thereafter impregnated with a Group VIII (Co and/or Ni) metal salt of an acid having an acidity of less than that of the Group VI heteropolyacid. This impregnated support is then dried and sulfided to provide a final catalyst.

The catalyst composition disclosed in the '717 patent may also be made by impregnating a support with both the Group VIII metal salt and the Group VI heteropolyacid followed by drying and then treating with a reducing agent, drying again, and sulfiding to form the final catalyst.

Another catalyst useful in the deep hydrodesulfurization and in other methods of hydrotreating hydrocarbon feedstocks and a method of making such catalyst and its activation are disclosed in U.S. Pat. No. 6,872,678. The catalyst of the '678 patent includes a carrier upon which a Group VIB hydrogenation metal component and/or a Group VIII hydrogenation metal component and a sulfur-containing organic compound additive are incorporated and further which has been contacted with a petroleum fraction organic liquid. The catalyst is treated with hydrogen either simultaneously with or after the incorporation of the organic liquid (petroleum fraction).

U.S. Pat. No. 8,262,905 discloses a composition that is particularly useful in the catalytic hydroprocessing of hydrocarbon feedstocks. One composition disclosed in the '905 patent includes a support material that is loaded with either an active metal precursor or a metal component of a metal salt, and hydrocarbon oil and a polar additive. The polar additive has a dipole moment of at least 0.45 and the weight ratio of hydrocarbon oil to polar additive in the composition is in the range of upwardly to 10:1. It is particularly desirable for the polar additive to be a heterocompound except those heterocompounds that include sulfur. The most preferred polar additive compounds are selected from the group of amide compounds.

U.S. Pat. No. 6,540,908 discloses a process for preparing a sulfided hydrotreating catalyst. This process involves combining a catalyst carrier of alumina and a hydrogenation metal catalyst carrier with an organic compound that includes a covalently bonded nitrogen atom and a carbonyl moiety followed by sulfiding the resulting combination. The '908 patent does not explicitly teach or exemplify that its organic compound can include a heterocyclic compound. A preferred organic compound is indicated to be one that satisfies the formula (R1R2)N—R3-N(R1'R2').

There is an ongoing need to find improved higher activity hydrotreating catalysts. There is also a need to find more economical manufacturing methods and improved methods of activating hydrotreating catalysts so as to provide catalysts having better activity than catalysts activated by alternative methods.

Accordingly, provided is a catalyst composition that comprises a support material that is loaded with an active metal precursor and a heterocyclic additive. In another embodiment of the invention, the catalyst composition comprises a support material containing a metal component of a metal salt solution and a heterocyclic additive.

The inventive catalyst composition may be made by one of several embodiments of the inventive preparation method. One such embodiment comprises incorporating a metal-containing solution into a support material to provide a metal-incorporated support material; and incorporating a heterocyclic additive into the metal-incorporated support material to thereby provide an additive-impregnated composition.

The catalyst composition of the invention is particularly useful in the hydroprocessing of hydrocarbon feedstocks and may be used in an inventive hydrotreating process of contacting under suitable hydrotreating process conditions the hydrocarbon feedstock with the catalyst composition to yield a treated product.

The composition of the invention is one which is particularly useful in the catalytic hydroprocessing of petroleum or other hydrocarbon feedstocks, or the composition of the invention is one which is convertible by the treatment with hydrogen or a sulfur compound, or both, into a catalyst composition having particularly good catalytic properties in the hydroprocessing of hydrocarbon feedstocks.

It is a significant feature of the inventive composition that, by using a heterocyclic compound selected from a specifically defined group of heterocyclic polar compounds, as more fully described elsewhere herein, to impregnate its support material that includes, among other components, a catalytic metal, a composition is provided having certain catalytic properties that are enhanced over alternative catalyst compositions. The inventive composition has been found to have enhanced catalytic properties over those of certain catalyst compositions prepared by using a mixture of a polar additive and hydrocarbon oil.

Another beneficial attribute of the invention is that the composition does not need to be calcined or to have sulfur added to it prior to its placement into a reactor vessel or within a reactor system for use in either hydrodesulfurization or hydrodenitrogenation of a hydrocarbon feedstock. This feature provides the particular benefit of significantly reducing certain costs that are associated with manufacturing and treatment of the composition, and it allows for the use of in situ activation methods that yield a catalyst composition which exhibits significantly improved hydrodesulfurization or hydrodenitrogenation, or both, catalytic activity over certain other hydrotreating catalyst compositions.

The composition of the invention further allows for an improved procedure in the start-up of hydrotreating reactor systems.

The composition of the invention includes a support material that has incorporated therein or is loaded with a metal component, which is or can be converted to a metal compound having activity towards the catalytic hydrogenation of organic sulfur or organic nitrogen compounds. Thus, it has application in the hydrotreating of hydrocarbon feedstocks.

The support material that contains the metal component further has incorporated therein a heterocyclic compound as an additive to thereby provide the additive-impregnated composition of the invention.

The support material of the inventive composition can comprise any suitable inorganic oxide material that is typically used to carry catalytically active metal components. Examples of possible useful inorganic oxide materials include alumina, silica, silica-alumina, magnesia, zirconia, boria, titania and mixtures of any two or more of such inorganic oxides. The preferred inorganic oxides for use in the formation of the support material are alumina, silica, silica-alumina and mixtures thereof. Most preferred, however, is alumina.

In the preparation of various embodiments of the inventive composition, the metal component of the composition may be incorporated into the support material by any suitable method or means providing for loading or incorporating into the support material an active metal precursor. Thus, the composition includes the support material and a metal component.

One method of incorporating the metal component into the support material, includes, for example, co-mulling the support material with the active metal or metal precursor to yield a co-mulled mixture of the two components. Or, another method includes the co-precipitation of the support material and metal component to form a co-precipitated mixture of the support material and metal component. Or, in a preferred method, the support material is impregnated with the metal component using any of the known impregnation methods, such as, incipient wetness, to incorporate the metal component into the support material.

When using an impregnation method to incorporate the metal component into the support material, it is preferred for the support material to be formed into a shaped particle comprising an inorganic oxide material and thereafter loaded with an active metal precursor, preferably, by the impregnation of the shaped particle with an aqueous solution of a metal salt to give the support material containing a metal of a metal salt solution.

To form the shaped particle, the inorganic oxide material, which preferably is in powder form, is mixed with water and, if desired or needed, a peptizing agent and/or a binder to form a mixture that can be shaped into an agglomerate. It is desirable for the mixture to be in the form of an extrudable paste suitable for extrusion into extrudate particles, which may be of various shapes such as cylinders, trilobes, etc. and nominal sizes such as 1/16", 1/8", 3/16", etc. The support material of the inventive composition, thus, preferably, is a shaped particle comprising an inorganic oxide material.

The shaped particle is then dried under standard drying conditions that can include a drying temperature in the range of from 50° C. to 200° C., preferably, from 75° C. to 175° C., and, most preferably, from 90° C. to 150° C.

After drying, the shaped particle is calcined under standard calcination conditions that can include a calcination temperature in the range of from 250° C. to 900° C., preferably, from 300° C. to 800° C., and, most preferably, from 350° C. to 600° C.

The calcined shaped particle can have a surface area (determined by the BET method employing $N_2$, ASTM test method D 3037) that is in the range of from 50 $m^2/g$ to 450 $m^2/g$, preferably from 75 $m^2/g$ to 400 $m^2/g$, and, most preferably, from 100 $m^2/g$ to 350 $m^2/g$.

The mean pore diameter in angstroms (Å) of the calcined shaped particle is in the range of from 50 to 200, preferably, from 70 to 150, and, most preferably, from 75 to 125.

The pore volume of the calcined shaped particle is in the range of from 0.5 cc/g to 1.1 cc/g, preferably, from 0.6 cc/g to 1.0 cc/g, and, most preferably, from 0.7 to 0.9 cc/g.

Less than ten percent (10%) of the total pore volume of the calcined shaped particle is contained in the pores having a pore diameter greater than 350 Å, preferably, less than 7.5% of the total pore volume of the calcined shaped particle is contained in the pores having a pore diameter greater than 350 Å, and, most preferably, less than 5%.

The references herein to the pore size distribution and pore volume of the calcined shaped particle are to those properties as determined by mercury intrusion porosimetry, ASTM test method D 4284. The measurement of the pore size distribution of the calcined shaped particle is by any suitable measurement instrument using a contact angle of 140° with a mercury surface tension of 474 dyne/cm at 25° C.

In a preferred embodiment of the invention, the calcined shaped particle is impregnated in one or more impregnation steps with a metal component using one or more aqueous solutions containing at least one metal salt wherein the metal compound of the metal salt solution is an active metal or active metal precursor.

The metal elements are those selected from Group 6 of the IUPAC Periodic Table of the elements (e.g., chromium (Cr), molybdenum (Mo), and tungsten (W)) and Groups 9 and 10 of the IUPAC Periodic Table of the Elements (e.g., cobalt (Co) and nickel (Ni)). Phosphorous (P) is also a desired metal component.

For the Group 9 and 10 metals, the metal salts include Group 9 or 10 metal acetates, formats, citrates, oxides, hydroxides, carbonates, nitrates, sulfates, and two or more thereof. The preferred metal salts are metal nitrates, for example, such as nitrates of nickel or cobalt, or both.

For the Group 6 metals, the metal salts include Group 6 metal oxides or sulfides. Preferred are salts containing the Group 6 metal and ammonium ion, such as ammonium heptamolybdate and ammonium dimolybdate.

The concentration of the metal compounds in the impregnation solution is selected so as to provide the desired metal content in the final composition of the invention taking into consideration the pore volume of the support material into which the aqueous solution is to be impregnated and the amounts of heterocyclic compound additive that is later to be incorporated into the support material that is loaded with a metal component. Typically, the concentration of metal compound in the impregnation solution is in the range of from 0.01 to 100 moles per liter.

The metal content of the support material having a metal component incorporated therein may depend upon the application for which the additive-impregnated composition of the invention is to be used, but, generally, for hydroprocessing applications, the Group 9 and 10 metal component, i.e., cobalt or nickel, can be present in the support material having a metal component incorporated therein in an amount in the range of from 0.5 wt. % to 20 wt. %, preferably from 1 wt. % to 15 wt. %, and, most preferably, from 2 wt. % to 12 wt. %.

The Group 6 metal component, i.e., molybdenum or tungsten, preferably, molybdenum, can be present in the support material having a metal component incorporated therein in an amount in the range of from 5 wt. % to 50 wt. %, preferably from 8 wt. % to 40 wt. %, and, most preferably, from 12 wt. % to 30 wt. %.

The above-referenced weight percents for the metal components are based on the dry support material and the metal component as the element regardless of the actual form of the metal component.

To provide the additive-impregnated composition of the invention, the heterocyclic compound additive is incorporated into the support material that also has incorporated therein, as described above, the active metal precursor. The heterocyclic compound additive is used to fill a significant portion of the available pore volume of the pores of the support material, which is already loaded with the active metal precursor, to thereby provide a composition that comprises, or consists essentially of, or consists of, a support material containing a metal component and a heterocyclic compound additive.

The preferred method of impregnating the metal loaded support material may be any standard well-known pore fill methodology whereby the pore volume is filled by taking advantage of capillary action to draw the liquid into the pores of the metal loaded support material. It is desirable to fill at least 75% of the pore volume of the metal loaded support material with the heterocyclic compound additive. It is preferred for at least 80% of the pore volume of the metal loaded support material to be filled with the heterocyclic compound additive, and, most preferred, at least 90% of the pore volume is filled with the heterocyclic compound additive.

The composition may be installed, as is, into a reactor vessel or within a reactor system that is to undergo a start-up procedure in preparation of or prior to the introduction of a sulfiding feed that can include a sulfiding agent or a hydrocarbon feedstock containing a concentration of an organic sulfur compound.

It is a significant aspect of the invention that the support material loaded with an active metal precursor is not calcined or sulfided prior to its loading into a reactor vessel or system for its ultimate use as a hydrotreating catalyst but that it can be sulfided, in situ, in a delayed feed introduction start-up procedure. The delayed feed introduction start-up procedure is hereinafter more fully described. Moreover, it has been determined that an improvement in catalytic activity is obtainable when, prior to hydrogen treatment and sulfiding, the support material loaded with the active metal precursor is filled with the heterocyclic compound additive. Thus, not only are certain economic benefits realized by eliminating, or at least not incurring, the costs associated with calcination and sulfidation of the catalyst prior to its delivery and use, but also a more active catalyst is obtained.

It has been found that the support material loaded with an active metal precursor that is impregnated with the heterocyclic compound additive before treatment with hydrogen followed by treatment with a sulfur compound provides for a hydrotreating catalyst having greater hydrodesulfurization and hydrodenitrogenation activities than the support material, loaded with an active metal precursor, but which has, instead, been impregnated with a mixture of a polar additive, such as dimethylformamide, and a hydrocarbon oil prior to the hydrogen and sulfur treatments.

In the preparation of the inventive composition, any suitable method or means may be used to impregnate the metal loaded support material with the heterocyclic compound additive. The preferred method of impregnation may be any standard well-known pore fill methodology whereby the pore volume is filled by taking advantage of capillary action to draw the liquid into the pores of the metal loaded support material. It is desirable to fill at least 75% of the pore volume of the metal loaded support material with the heterocyclic compound additive. It is preferred for at least 80% of the pore volume of the metal loaded support material to be filled with the heterocyclic compound additive, and, most preferred, at least 90% of the pore volume is filled with the heterocyclic compound additive.

In one embodiment of the invention, it is desirable for the catalyst composition to have a material absence of hydrocarbon oil. The hydrocarbon oil that is absent from the composition of this embodiment can include hydrocarbons having a boiling temperature in the range of from 100° C. to 550° C. and, more specifically, from 150° C. to 500° C. Possible hydrocarbon oils to be excluded from the support material may include crude oil distillate fractions, such as, for example, heavy naphtha, containing hydrocarbons boiling, perhaps, in the range of from 100° C. to 210° C., kerosene, diesel, and gas oil.

The more specific hydrocarbon oil that should be excluded in material amounts from the composition in this embodiment are those that include olefin compounds that are liquid at the elevated contacting temperature of the hydrogen-containing gaseous atmosphere during treatment therewith. Such olefins are those having a carbon number greater than 12 and, generally, having a carbon number in the range of from 12 to 40 carbons. More specifically, the olefin compounds are those having from 14 to 38 carbons, and, most specifically, the carbon number is in the range of from 16 to 36 carbons. The olefins may be in an admixture with non-olefinic hydrocarbons, such as alkanes or aromatic solvents or any of the above-referenced petroleum distillate fractions, such as, heavy naphtha, kerosene, diesel, and gas oil.

In view of the above, an embodiment of the inventive catalyst composition has a material absence of or an absence of a hydrocarbon oil, but, otherwise, the inventive catalyst composition comprises, or consists essentially of, or consists of, as support material containing a metal component either of a metal salt solution or an active metal precursor and a heterocyclic compound additive. The hydrocarbon oil can be either a mixture of hydrocarbons having a boiling temperature in the range of from 100° C. to 550° C. or from 150° C. to 500° C. or any of the olefins-containing hydrocarbon oils as described above.

What is meant herein by the use of the term "material absence" is that the amount of hydrocarbons present in the composition is such that it has no material effect upon the ultimate catalytic performance of the final catalyst composition of the invention either before or after its treatment with hydrogen or sulfur, or both. Thus, a material absence of the hydrocarbon from the composition may, however, allow for the presence of non-material amounts of hydrocarbons that have no effect upon catalyst performance.

In general, the olefin content of the hydrocarbon oil to be excluded in a material quantity is be above 5 wt. %, and, in certain instances, it can exceed 10 wt. %, or even exceed 30 wt. %. The olefin compounds may include monoolefins or they may include olefins with multiple carbon double bonds.

The heterocyclic compound that is used as an additive in the preparation of the inventive composition is any suitable heterocyclic, polar compound that provides for the benefits and has the characteristic properties as described herein. Specifically, the hetero to cyclic compound additive of the composition is selected from the group of heterocyclic, polar compounds having the formula: $C_xH_nN_yO_z$, wherein: x is an integer of 3 or larger; y is either zero or an integer in the range of from 1 to 3 (i.e., 0, 1, 2, or 3); z is either zero or an integer in the range of from 1 to 3 (i.e., 0, 1, 2, or 3); and n is the number of hydrogen atoms required to fill the remaining bonds with the carbon atoms of the molecule.

Preferred additive compounds are those heterocyclic compounds containing either nitrogen or oxygen as the heteroatom member of its ring, such as molecular compounds having either a lactam structure or a cyclic ester structure or a cyclic ether structure.

The lactam compounds, or cyclic amides, may include compounds having such general structures as β-lactam, γ-lactam, and δ-lactam in which the nitrogen atom may instead of a hydrogen atom have bonded thereto an alkyl group having from 1 to 6 or more carbon atoms and any of the carbon atoms, other than the carbonyl moiety, present in the ring structure may have bonded thereto an alkyl group having from 1 to 6 or more carbon atoms.

The cyclic ether compounds, or oxacycloalkanes, may include cyclic compounds in which one or more of the carbon atoms within the ring structure is replaced with an oxygen atom. The cyclic ether compound may also include within the ring a carbonyl moiety or any one or more of the carbon atoms present in the ring structure may have bonded thereto an alkyl group having from 1 to 6 or more carbon atoms, or the ring may include both a carbonyl moiety and one or more carbon atoms having bonded thereto an alkyl group having from 1 to 6 or more carbon atoms.

The cyclic ester compounds may include lactone compounds that fit the structure presented above, for example, β-propiolactone, γ-butyrolactone, and δ-valerolactone. The cyclic ester compounds further may include the cyclic esters having more than one oxygen atom contained within the ring structure.

More preferred additive compounds are those heterocyclic compounds in which the heteroatom is either oxygen or nitrogen.

Examples of more preferred compounds include propylene carbonate, e.g., a cyclic ester compound, and N-methylpyrrolidone, e.g. a cyclic amide compound.

A particularly important aspect of the invention is for the support material having a metal component incorporated therein to be uncalcined and non-sulfided when it is impregnated with the heterocyclic compound additive. Cost savings in the preparation of to the composition are realized by not having to perform the calcination or sulfidation steps. But, moreover, it has been found that, when the additive-impregnated composition is further subjected to a hydrogen treatment and sulfur treatment, the resulting catalyst composition exhibits enhanced catalytic activity.

Before the incorporation of the heterocyclic compound additive into the support material having a metal component incorporated therein, particularly when the metal component is added to the support material by impregnation using an aqueous solution of a metal salt (metal-impregnated support material), it is important for this metal-impregnated support material to be dried so as to remove at least a portion of the volatile liquid contained within the pores of the support material so as to provide pore volume that can be filled with the additive. The metal-impregnated support material, thus, is dried under drying conditions that include a drying temperature that is less than a calcination temperature.

A significant feature of the invention is that the drying temperature under which the drying step is conducted does not exceed a calcination temperature. Thus, the drying temperature should not exceed 400° C., and, preferably, the drying temperature at which the metal-impregnated support material is dried does not exceed 300° C., and, most preferably, the drying temperature does not exceed 250° C. It is understood that the drying step will, in general, be conducted at lower temperatures than the aforementioned temperatures, and, typically, the drying temperature will be conducted at a temperature in the range of from 60° C. to 150° C.

The drying of the metal-impregnated support material is preferably controlled in a manner so as to provide the resulting dried metal-impregnated support material having a volatiles content that is in a particular range. The volatiles content of the dried metal-impregnated support material should be controlled so that it does not exceed 20 wt. % LOI. The LOI, or loss on ignition, is defined as the percentage weight loss of the material after its exposure to air at a temperature of 482° C. for a period of two hours, which can be represented by the following formula: (sample weight before exposure less sample weight after exposure) multiplied by 100 and divided by (sample weight before exposure). It is preferred for the LOI of the dried metal-impregnated support material to be in the range of from 1 wt. % to 20 wt. %, and, most preferred, from 3 wt. % to 15 wt. %. The dried metal-impregnated support material is further impregnated with the heterocyclic compound additive as earlier described herein.

The additive-impregnated composition of the invention may be treated, either ex situ or in situ, with hydrogen and with a sulfur compound, and, indeed, it is one of the beneficial features of the invention that it permits the shipping and delivery of a non-sulfurized composition to a reactor in which it can be activated, in situ, by a hydrogen treatment step followed by a sulfurization step. As earlier noted, the additive-impregnated composition can first undergo a hydrogen treatment that is then followed with treatment with a sulfur compound.

The hydrogen treatment includes exposing the additive-impregnated composition to a gaseous atmosphere containing hydrogen at a temperature ranging upwardly to 250° C. Preferably, the additive-impregnated composition is exposed to the hydrogen gas at a hydrogen treatment temperature in the range of from 100° C. to 225° C., and, most preferably, the hydrogen treatment temperature is in the range of from 125° C. to 200° C.

The partial pressure of the hydrogen of the gaseous atmosphere used in the hydrogen treatment step generally can be in the range of from 1 bar to 70 bar, preferably, from 1.5 bar to 55 bar, and, most preferably, from 2 bar to 35 bar. The additive-impregnated composition is contacted with the gaseous atmosphere at the aforementioned temperature and pressure conditions for a hydrogen treatment time period in the range of from 0.1 hours to 100 hours, and, preferably, the hydrogen treatment time period is from 1 hour to 50 hours, and most preferably, from 2 hours to 30 hours.

Sulfiding of the additive-impregnated composition after it has been treated with hydrogen can be done using any conventional method known to those skilled in the art. Thus, the hydrogen treated additive-impregnated composition can be contacted with a sulfur-containing compound, which can be hydrogen sulfide or a compound that is decomposable into hydrogen sulfide, under the contacting conditions of the invention. Examples of such decomposable compounds include mercaptans, $CS_2$, thiophenes, dimethyl sulfide (DMS), and dimethyl disulfide (DMDS).

Also, preferably, the sulfiding is accomplished by contacting the hydrogen treated composition, under suitable sulfurization treatment conditions, with a hydrocarbon feedstock that contains a concentration of a sulfur compound. The sulfur compound of the hydrocarbon feedstock can be an organic sulfur compound, particularly, one which is typically contained in petroleum distillates that are processed by hydrodesulfurization methods.

Suitable sulfurization treatment conditions are those which provide for the to conversion of the active metal components of the hydrogen treated additive-impregnated composition to their sulfided form. Typically, the sulfiding temperature at which the hydrogen treated additive-impregnated composition is contacted with the sulfur compound is in the range of from 150° C. to 450° C., preferably, from 175° C. to 425° C., and, most preferably, from 200° C. to 400° C.

When using a hydrocarbon feedstock that is to be hydrotreated using the catalyst composition of the invention to sulfide the hydrogen treated composition, the sulfurization conditions can be the same as the process conditions under which the hydrotreating is performed. The sulfiding pressure at which the hydrogen treated additive-impregnated composition is sulfided generally can be in the range of from 1 bar to 70 bar, preferably, from 1.5 bar to 55 bar, and, most preferably, from 2 bar to 35 bar.

As noted above, one of the benefits provided by the additive-impregnated composition of the invention is that it can be utilized in a reactor system that is started up using a so-called delayed feed introduction procedure. In the delayed feed introduction procedure, the reactor system, which includes a reactor vessel containing the additive-impregnated composition, first undergoes a heating step to raise the temperature of the reactor and the additive-impregnated composition contained therein in preparation for the introduction of a sulfiding agent or heated hydrocarbon feedstock for processing. This heating step includes introducing into the reactor the hydrogen-containing gas at the aforementioned hydrogen treatment conditions. After the hydrogen treatment of the additive-impregnated composition, it is thereafter treated with a sulfur compound in the manner as earlier described herein.

It has been found that the hydrocarbon oil-containing composition, after undergoing the hydrogen treatment followed by treatment with a sulfur compound, exhibits a greater catalytic activity toward hydrodesulfurization of a distillate feedstock than do other similar, but non-impregnated compositions.

It is recognized that the additive-impregnated composition of the invention, after its treatment with hydrogen and sulfur, is a highly effective catalyst for use in the hydrotreating of hydrocarbon feedstocks. This catalyst is particularly useful in applications involving the hydrodesulfurization and hydrodenitrogenation of hydrocarbon feedstocks, and, especially, it has been found to be an excellent catalyst for use in the hydrodesulfurization of distillate feedstocks, in particular, diesel, to make an ultra-low sulfur distillate product having a sulfur concentration of less than 15 ppmw, preferably, less than 10 ppmw, and, most preferably, less than 8 ppmw.

In the hydrotreating applications, the additive-impregnated composition that is used in a delayed feed introduction procedure or otherwise treated with hydrogen and sulfur, as described above, is contacted under suitable hydrodesulfurization or hydrodenitrogenation, or both, conditions with a hydrocarbon feedstock that typically has a concentration of sulfur or nitrogen, or both.

The more typical and preferred hydrocarbon feedstock processed with the additive-impregnated composition is a petroleum middle distillate cut having a boiling temperature at atmospheric pressure in the range of from 140° C. to 410° C. These temperatures are approximate initial and boiling temperatures of the middle distillate. Examples of refinery streams intended to be included within the meaning of middle distillate include straight run distillate fuels boiling in the referenced boiling range, such as, kerosene, jet fuel, light diesel oil, heating oil, heavy diesel oil, and the cracked distillates, such as FCC cycle oil, coker gas oil, and hydrocracker distillates. The preferred feedstock of the inventive distillate hydrotreating process is a middle distillate boiling in the diesel boiling range of from about 140° C. to 400° C.

The sulfur concentration of the middle distillate feedstock can be a high concentration, for instance, being in the range upwardly to about 2 weight percent of the distillate feedstock based on the weight of elemental sulfur and the total weight of the distillate feedstock inclusive of the sulfur compounds. Typically, however, the distillate feedstock of the inventive process has a sulfur concentration in the range of from 0.01 wt. % (100 ppmw) to 1.8 wt. % (18,000). But, more typically, the sulfur concentration is in the range of from 0.1 wt. % (1000 ppmw) to 1.6 wt. % (16,000 ppmw), and, most typically, from 0.18 wt. % (1800 ppmw) to 1.1 wt. % (11,000 ppmw).

It is understood that the references herein to the sulfur content of the distillate feedstock are to those compounds that are normally found in a distillate feedstock or in the hydrodesulfurized distillate product and are chemical compounds that contain a sulfur atom and which generally include organosulfur compounds.

Also, when referring herein to "sulfur content" or "total sulfur" or other similar reference to the amount of sulfur that is contained in a feedstock, product or other hydrocarbon stream, what is meant is the value for total sulfur as determined by the test method ASTM D2622-10, entitled "Standard Test Method for Sulfur in Petroleum Products by Wavelength Dispersive X-ray Fluorescence Spectrometry." The use of weight to percent (wt. %) values of this specification when referring to sulfur content correspond to mass % values as would be reported under the ASTM D2622-10 test method.

The middle distillate feedstock may also have a concentration of nitrogen compounds. When it does have a concentration of nitrogen compounds, the nitrogen concentration may be in the range of from 15 parts per million by weight (ppmw) to 3500 ppmw. More typically for the middle distillate feedstocks that are expected to be handled by the process, the nitrogen concentration of the middle distillate feedstock is in the range of from 20 ppmw to 1500 ppmw, and, most typically, from 50 ppmw to 1000 ppmw.

When referring herein to the nitrogen content of a feedstock, product or other hydrocarbon stream, the presented concentration is the value for the nitrogen content as determined by the test method ASTM D5762-12 entitled "Standard Test Method for Nitrogen in Petroleum and Petroleum Products by Boat-Inlet Chemiluminescence." The units used in this specification, such as ppmw or wt. %, when referring to nitrogen content are the values that correspond to those as reported under ASTM D5762, i.e., in micrograms/gram (ug/g) nitrogen, but converted into referenced unit.

The additive-impregnated composition of the invention may be employed as a part of any suitable reactor system that provides for contacting it or its derivatives with the distillate feedstock under suitable hydrodesulfurization conditions that may include the presence of hydrogen and an elevated total pressure and temperature. Such suitable reaction systems can include fixed catalyst bed systems, ebullating catalyst bed systems, slurried catalyst systems, and fluidized catalyst bed systems.

The preferred reactor system is that which includes a fixed bed of the inventive catalyst contained within a reactor vessel equipped with a reactor feed inlet means, such as a feed nozzle, for introducing the distillate feedstock into the reactor vessel, and a reactor effluent outlet means, such as an effluent outlet nozzle, for withdrawing the reactor effluent or the treated hydrocarbon product or the ultra-low sulfur distillate product from the reactor vessel.

The hydrotreating process (either hydrodenitrogenation or hydrodesulfurization, or both) generally operates at a hydrotreating reaction pressure in the range of from 689.5 kPa (100 psig) to 13,789 kPa (2000 psig), preferably from 1896 kPa (275 psig) to 10,342 kPa (1500 psig), and, more preferably, from 2068.5 kPa (300 psig) to 8619 kPa (1250 psig).

The hydrotreating reaction temperature is generally in the range of from 200° C. (392° F.) to 420° C. (788° F.), preferably, from 260° C. (500° F.) to 400° C. (752° F.), and, most to preferably, from 320° C. (608° F.) to 380° C. (716° F.).

It is recognized that one of the unexpected features of the use of the inventive additive-impregnated composition of the invention is that, in a delayed feed introduction application, the resultant catalyst has a significantly higher catalytic activity than certain other alternative catalyst compositions, and, thus, it will, in general, provide for comparatively lower required process temperatures for a given amount of desulfurization or denitrogenation.

The flow rate at which the distillate feedstock is charged to the reaction zone of the inventive process is generally such as to provide a liquid hourly space velocity (LHSV) in the range of from 0.01 $hr^{-1}$ to 10 $hr^{-1}$. The term "liquid hourly space velocity", as used herein, means the numerical ratio of the rate at which the distillate feedstock is charged to the reaction zone of the inventive process in volume per hour divided by the volume of catalyst contained in the reaction zone to which the distillate feedstock is charged. The preferred LHSV is in the range of from 0.05 $hr^{-1}$ to 5 $hr^{-1}$, more preferably, from 0.1 $hr^{-1}$ to 3 $hr^{-1}$. and, most preferably, from 0.2 $hr^{-1}$ to 2 $hr^{-1}$.

It is preferred to charge hydrogen along with the distillate feedstock to the reaction zone of the inventive process. In this instance, the hydrogen is sometimes referred to as hydrogen treat gas. The hydrogen treat gas rate is the amount of hydrogen relative to the amount of distillate feedstock charged to the reaction zone and generally is in the range upwardly to 1781 $m^3/m^3$ (10,000 SCF/bbl). It is preferred for the treat gas rate to be in the range of from 89 $m^3/m^3$ (500 SCF/bbl) to 1781 $m^3/m^3$ (10,000 SCF/bbl), more preferably, from 178 $m^3/m^3$ (1,000 SCF/bbl) to 1602 $m^3/m^3$ (9,000 SCF/bbl), and, most preferably, from 356 $m^3/m^3$ (2,000 SCF/bbl) to 1425 $m^3/m^3$ (8,000 SCF/bbl).

The desulfurized distillate product yielded from the process of the invention has a low or reduced sulfur concentration relative to the distillate feedstock. A particularly advantageous aspect of the inventive process is that it is capable of providing a deeply desulfurized diesel product or an ultra-low sulfur diesel product. As already noted herein, the low sulfur distillate product can have a sulfur concentration that is less than 50 ppmw or any of the other noted sulfur concentrations as described elsewhere herein (e.g., less than 15 ppmw, or less than 10 ppmw, or less than 8 ppmw).

If the hydrotreated distillate product yielded from the process of the invention has a reduced nitrogen concentration relative to the distillate feedstock, it typically is at a to concentration that is less than 50 ppmw, and, preferably, the nitrogen concentration is less than 20 ppmw or even less than 15 or 10 ppmw.

The following examples are presented to further illustrate certain aspects of the invention, but they are not to be construed as limiting the scope of the invention.

EXAMPLE 1

Description of Cobalt/Molydenum Containing Catalyst Compositions

This Example 1 presents details regarding the inventive cobalt/molybdenum catalyst composition (Catalyst A) and the comparison cobalt/molybdenum catalyst composition (Catalyst B) and methods used to prepare these compositions.

A commercially available alumina carrier was used in the preparation of the catalyst compositions of this Example I. The following Table 1 presents the typical physical properties of the alumina carrier that was used in the preparations.

TABLE 1

Typical Alumina Carrier Properties

| Property | Value |
| --- | --- |
| Compacted Bulk Density (g/cc) | 0.49 |
| Water Pore Volume (cc/g) | 0.868 |
| BET Surface Area (m2/g) | 300 |
| Median Pore Diameter by Volume (angstroms) | 91 |

The metal components of the catalyst were incorporated into the carrier by the incipient wetness impregnation technique to yield the following metals composition (oxide basis): 14.8% Mo, 4.2% Co, 2.4% P. The impregnation solution included 13.13 weight parts phosphoric acid (27.3% P), 13.58 weight parts cobalt carbonate (46.2% Co), and 33.09 weight parts Climax molybdenum trioxide (62.5% Mo). The total volume of the resulting solution at ambient was equal to 98% of the Water Pore Volume of 100 weight parts of the alumina support to provide a metal-incorporated support material.

The impregnated carrier or metal-incorporated support material was then dried at 125° C. (257° F.) for a period of several hours to give a dried intermediate having an LOI of 8 wt % and a water pore volume of 0.4 cc/g.

Aliquot portions of the dried intermediate were then each impregnated with a selection of one of the following additives or additive mixtures to fill 95% of the pore volume of the dried intermediate: 100% of propylene carbonate (Sigma Aldrich) yielding Catalyst A, and a mixture of 50% dimethylformamide (DMF) and an olefin oil C18-30 yielding Catalyst B.

EXAMPLE 2

Catalyst Activities Under Very Low Pressure Reaction Conditions

This Example 2 presents the results of hydrodesulfurization (HDS) and hydrodenitrogenation (HDN) activity performance testing conducted under very low reaction pressure conditions for Catalyst A and Catalyst B when used in the processing of light straight run gas oil feedstocks (SRGO).

Pilot plant tests were performed comparing the HDS and HDN activities of Catalyst A and Catalyst B used under very low pressure (VLP), i.e., at either 290 psig (10 barg) or 340 psig (12 barg), reaction conditions. The process conditions used in these tests are shown in Table 2.

The feeds used in the tests were light SRGO (Straight Run Gas Oil) materials. The properties of the test feeds are shown in Table 3.

TABLE 2

Very Low Pressure Pilot Plant Test Process Conditions

| | VLP Test 1 | VLP Test 2 |
| --- | --- | --- |
| Pressure (psig/barg) | 340/12 | 290/10 |
| LHSV (hr$^{-1}$) | 0.65 | 0.75 |
| H$_2$/Oil (SCFB/Nm$^3$/m$^3$) | 600/100 | 1200/200 |
| Target S Level (wppm) | 10 | 10 |

TABLE 3

Very Low Pressure (VLP) Pilot Plant Test Feeds

| Feed Type | SRGO | SRGO |
| --- | --- | --- |
| Density @ 60 F. (g/cc) | 0.8483 | 0.8413 |
| API Gr @ 60 F. | 35.3 | 36.9 |
| Sulfur (wt %) | 0.378 | 1.14 |
| Nitrogen (wppm) | 20 | 52 |
| UV Aromatics (wt %) | | |
| Mono | 6.03 | 5.25 |
| Di | 4.30 | 3.90 |
| Tri | 0.56 | 0.82 |
| Tetra | 0.44 | 0.52 |
| Poly | 5.3 | 5.24 |
| Total | 11.33 | 10.49 |
| D-2887 Distillation (wt %) | ° F./° C. | ° F./° C. |
| IBP | 252/122 | 269/132 |
| 10% | 446/230 | 454/234 |
| 20% | 489/254 | 505/263 |
| 30% | 512/267 | 531/277 |
| 50% | 549/287 | 572/300 |
| 70% | 582/306 | 602/317 |
| 90% | 618/326 | 649/343 |
| 95% | 631/333 | 666/352 |
| EP | 658/348 | 707/375 |

Figure 1:
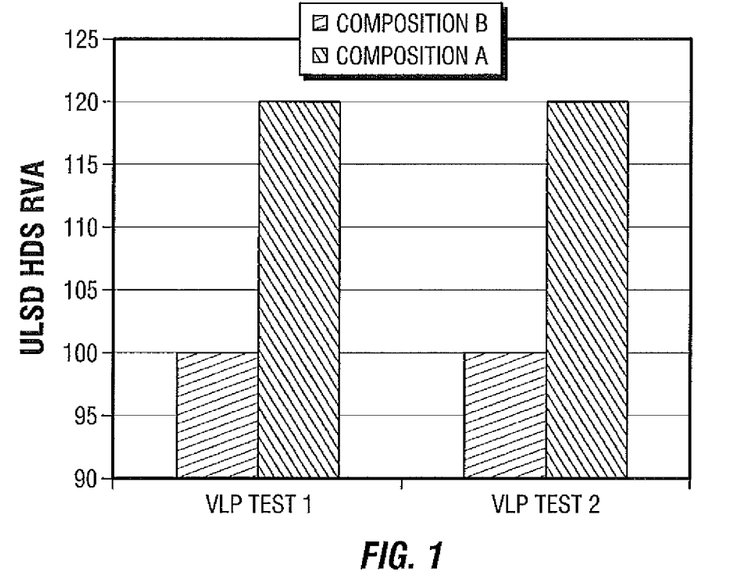
FIG. 1 presents the relative volume hydrodesulfurization (HDS) activity for yielding an ultra-low sulfur diesel product, i.e., a diesel product having a sulfur content of 10 ppmw, under two different, but very low-pressure, reaction conditions for an inventive Co/Mo catalyst composition and a comparative Co/Mo catalyst composition.

The process conditions and feed properties are representative of typical very low pressure ultra-low sulfur diesel (ULSD) operations. The ULSD HDS results obtained in VLP Test 1 and VLP Test 2 are shown in FIG. 1. These plots show the Relative Volume Activity (RVA) of Catalyst A and of Catalyst B for ULSD HDS, wherein the sulfur content of the product is equal to 10 ppmw.

Figure 2:
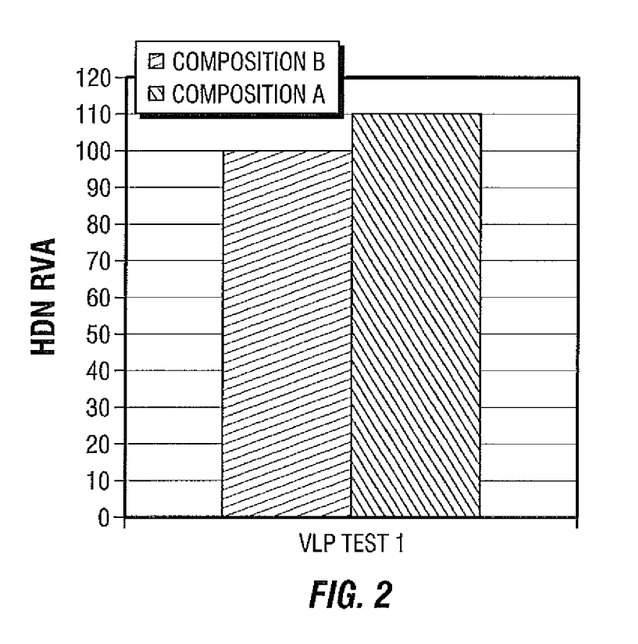
FIG. 2 presents the relative volume deep hydrodenitrogenation (HDN) activity, i.e., to yield a diesel product having a nitrogen content of 5 ppm, under very low-pressure reaction conditions for an inventive Co/Mo catalyst composition and a comparative Co/Mo catalyst composition.

HDN results for VLP Test 1 are shown in FIG. 2. These plots show the Relative to Volume Activity (RVA) of Catalyst A and Catalyst B for deep HDN, wherein the nitrogen content of the product is equal to 5 wppm.

In both of the VLP test runs, Catalyst A provided a 20% improvement in ULSD HDS activity over the ULSD HDS activity of Catalyst B.

In VLP Test 1, Catalyst A showed a 10% higher HDN activity over the HDN activity of Catalyst B.

The improvements in the catalyst activity of inventive Catalyst A over comparison Catalyst B are significant. These improvements allow for the processing of more difficult feedstocks or for the processing of feedstocks at higher throughput rates, or a combination of both. Moreover, the difficult feedstock processing or higher feed throughput rates can successfully be performed under the more challenging very low-pressure reaction conditions.

In VLP Test 2, essentially identical product nitrogen concentrations were achieved with both Catalyst A and Catalyst B. This suggests that an HDN floor is reached with both of the catalyst compositions.

The H$_2$ consumption in the VLP Test 1 was substantially the same for both Catalyst A and Catalyst B. It is significant that under the very low pressure conditions of VLP Test 1, Catalyst A provided substantial ULSD HDS and HDN improvements without an increase in H$_2$ consumption.

EXAMPLE 3

Description of Nickel/Molydenum Containing Catalyst Compositions

This Example 3 presents details regarding the inventive nickel/molybdenum catalyst composition (Catalyst C) and the comparison nickel/molybdenum catalyst composition (Catalyst D) and the methods used to prepare these compositions.

The alumina carrier used in the preparation of the catalyst compositions of this Example 3 is the carrier described in Example 1.

The metal components of the catalyst were incorporated into the carrier by the incipient wetness impregnation technique to yield the following metals composition (oxide basis): 18.0% Mo, 4.5% Ni, 3.3% P. The alumina support properties are indicated in Table 2. The impregnation solution included 20.68 weight parts phosphoric acid (27.3% P), 13.58 weight parts nickel carbonate (43.7% Ni), and 46.11 weight parts Climax molybdenum trioxide (62.5% Mo). The total volume of the resulting solution at ambient was equal to 98% of the Water Pore Volume of 100 weight parts of the alumina support to provide a metal-incorporated support material.

The impregnated carrier or metal-incorporated support material was then dried at 125° C. (257° F.) for a period of several hours to give a dried intermediate having an LOI of 10 wt % and a water pore volume of 0.33 cc/g.

Aliquot portions of the dried intermediate were then each impregnated with a selection of one of the following additives or additive mixtures to fill 95% of the pore volume of the dried intermediate: 100% of N-methylpyrrolidone (Sigma Aldrich) yielding Catalyst C, and a mixture of 50% dimethylformamide (DMF) and an olefin oil C18-30 yielding Catalyst D.

EXAMPLE 4

Low/Moderate Pressure Conditions With Stacked-Bed Catalyst Systems

This Example 4 presents results from hydrodesulfurization (HDS) and hydrodenitrogenation (HDN) activity performance testing of various stacked-bed catalyst systems and a single-bed catalyst system in the processing of a feedstock blend of straight run gas oil and light cycle oil.

The stacked-bed catalyst systems that were tested are described below. These stacked-bed catalyst systems include combinations of the inventive and comparative cobalt/molybdenum catalyst compositions with the inventive and comparative nickel/molybdenum catalyst compositions. The processing conditions are under low to moderate reaction pressure conditions. Presented are the HDS activity, HDN activity and relative hydrogen consumption results for each of the catalyst systems CS1, CS2, CS3 and CS4.

The catalyst systems tested are shown in Table 4. The details concerning Catalyst A, Catalyst B, Catalyst C, and Catalyst D are presented in above Examples 1 and 3.

TABLE 4

| Stacked-Bed and Single-Bed Catalyst Systems of the Test | | | |
|---|---|---|---|
| Catalyst | Catalyst System Description | | |
| Systems (CS) | Top | Middle | Bottom |
| 1 | Catalyst B/Catalyst D/Catalyst B | | |
| 2 | Catalyst A/Catalyst D/Catalyst A | | |
| 3 | Catalyst A/Catalyst C/Catalyst A | | |
| 4 | Catalyst A | | |

Each of the catalyst systems CS1, CS2, and CS3 of the test was a stacked-bed reactor system that included two catalyst beds of cobalt/molybdenum catalyst with a middle catalyst bed of nickel/molybdenum catalyst placed between the top and bottom cobalt/molybdenum catalyst beds. The relative volumetric ratios of the three catalyst beds of the stacked-bed reactor systems were, respectively, 15, 30, and 55 (15/30/55). Thus, the top catalyst bed included a bed of cobalt/molybdenum catalyst particles that was 15 volume percent (vol %) of the total catalyst volume of the stacked-bed reactor system, the middle catalyst bed included a bed of nickel/molybdenum catalyst particles that was 30 vol % of the total catalyst volume of the stacked-bed reactor system, and the bottom catalyst bed included a bed of cobalt/molybdenum catalyst that was 55 vol % of the total catalyst volume of the stacked-bed reactor system.

Catalyst System 1 (CS1) was the comparative stacked-bed reactor system. CS1 comprised, in order of the top bed, middle bed, and bottom bed, Catalyst B/Catalyst Di/Catalyst B in the aforementioned proportions.

Catalyst System 2 (CS2) comprised the inventive Catalyst A placed in the both the top and bottom beds of the stacked-bed reactor system and the comparison Catalyst B was placed in the middle bed. Thus, in effect, the comparison Catalyst B of both the top and bottom beds of CS1 was replaced with the inventive Catalyst A and the comparison Catalyst D of CS1 was not changed.

Catalyst System 3 (CS3), however, utilized the inventive cobalt/molybdenum catalyst, Catalyst A, in both the top and bottom beds of the stacked-bed reactor system and the inventive nickel/molybdenum catalyst, Catalyst C, in the middle bed. Thus, in this case, both comparison Catalyst B and comparison Catalyst D of CS1 were respectively replaced with the inventive catalysts Catalyst A and Catalyst C.

Catalyst System 4 (CS4) was a single-bed catalyst system with the catalyst bed being composed of the inventive cobalt/molybdenum Catalyst A.

The feed used in testing of the above-described stacked-bed and single-bed catalyst systems was an 80/20 blend (volumetric basis) of straight run gas oil (SRGO) and a fluidized catalytic cracking unit light cycle oil (LCO). The properties of the feed used in these pilot plant tests are shown in Table 5.

TABLE 5

| Test Feed Properties | |
|---|---|
| Feed Type | SRGO/LCO (80/20 Vol. Ratio) |
| Density @ 60 F. (g/cc) | 0.8697 |
| API @ 60 F. | 31.20 |
| Carbon (wt %) | 86.09 |
| Hydrogen (wt %) | 12.47 |
| Sulfur (wt %) | 1.310 |
| Nitrogen (wppm) | 206 |
| UV Aromatics (wt %) | |
| Mono | 6.44 |
| Di | 8.35 |
| Tri | 2.48 |
| Tetra | 0.97 |
| Poly | 11.80 |
| Total | 18.24 |
| SFC Aromatics (wt %) (D-5186) | |
| Mono | 17.3 |
| Poly | 21.3 |
| Total | 38.6 |

TABLE 5-continued

Test Feed Properties

| D-2887 Distillation (wt %) | ° F./° C. |
|---|---|
| IBP | 228/109 |
| 10% | 409/209 |
| 30% | 484/251 |
| 50% | 537/281 |
| 70% | 594/312 |
| 90% | 667/353 |
| 95% | 695/368 |
| FBP | 747/397 |

The process conditions used in processing the above feed in this series of tests are representative of typical commercial operating conditions. These process conditions are shown in Table 6.

TABLE 6

Test Process Conditions

| Pressure (psig/barg) | 520/36 & 750/52 |
|---|---|
| LHSV (hr$^{-1}$) | 0.77 |
| H$_2$/Oil (SCFB/Nm$^3$/m$^3$) | 1745/290 |
| Target S Level (wppm) | 8 |

The stacked-bed catalyst systems are typically used to maximize ULSD HDS activity while controlling or managing H$_2$ consumption. Thus, ULSD HDS and Relative H$_2$Consumption (RHC) data were obtained for the catalyst systems tested. These data are shown in FIG. 3 and FIG. 4.

Figure 3:
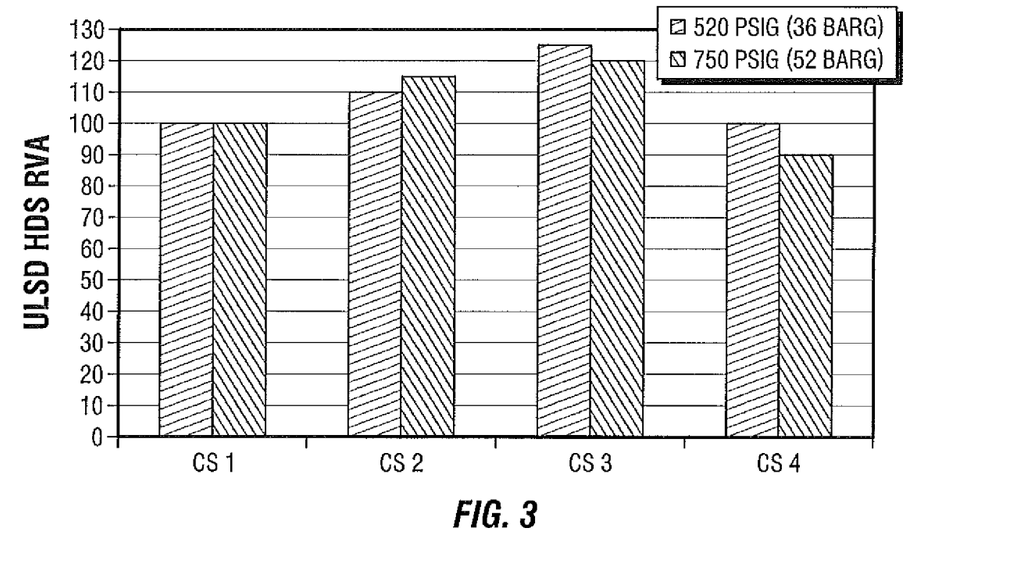
FIG. 3 presents the relative volume hydrodesulfurization (HDS) activity for yielding an ultra-low sulfur diesel product under two different low to moderate pressure reaction conditions for several different stacked catalyst bed reactor systems (CS1, CS2, CS3) and for a single catalyst bed reactor system (CS4).
Figure 4:
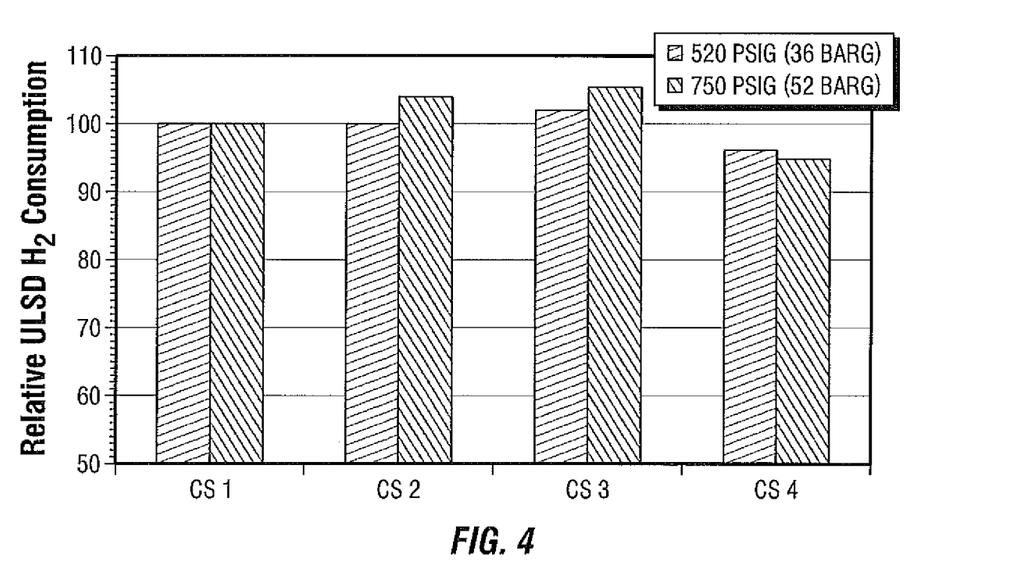
FIG. 4 presents the relative hydrogen consumption under the two low to moderate pressure reaction conditions for the stacked catalyst bed reactor systems and single catalyst bed reactor system of FIG. 3.

From FIG. 3 and FIG. 4, it is seen that at a reaction pressure of 520 psig (36 barg) the CS2 system exhibited an ULSD HDS RVA of 110 as compared to the 100 value for the CS1 system. It is also significant that the CS2 system used no additional H$_2$ consumption. The CS3 system ULSD HDS RVA for this reaction pressure was 125 compared to the 100 value for the CS1 system. This is a significant improvement in activity, and it only resulted in a small 2% increase in H$_2$ consumption.

In comparing the single bed CS4 with CS1, when operated at the reaction pressure of 520 psig (36 barg), CS4 exhibited the same ULSD HDS activity as did the CS1 system, but it exhibited an advantageously lower H$_2$ consumption of about 4%.

When operated at the higher reactor pressure of 750 psig (52 barg), the CS2 and CS3 systems had ULSD HDS RVA values of 115 and 120, respectively, as compared to the 100 value for the CS1. The corresponding relative H$_2$ consumption values were 104 and 105, respectively. At the pressure of 750 psig (52 barg), the CS1 system had an ULSD HDS RVA of 100 and an RHC of 100 compared to respective values of 90 and 95 for the single bed CS4 system. The difference in the relative performance of these two systems at the 520 psig (36 barg) and 750 psig (52 barg) pressure levels is believed to be due to better utilization of the comparative Catalyst D in the CS1 system at the higher pressure level.

Figure 5:
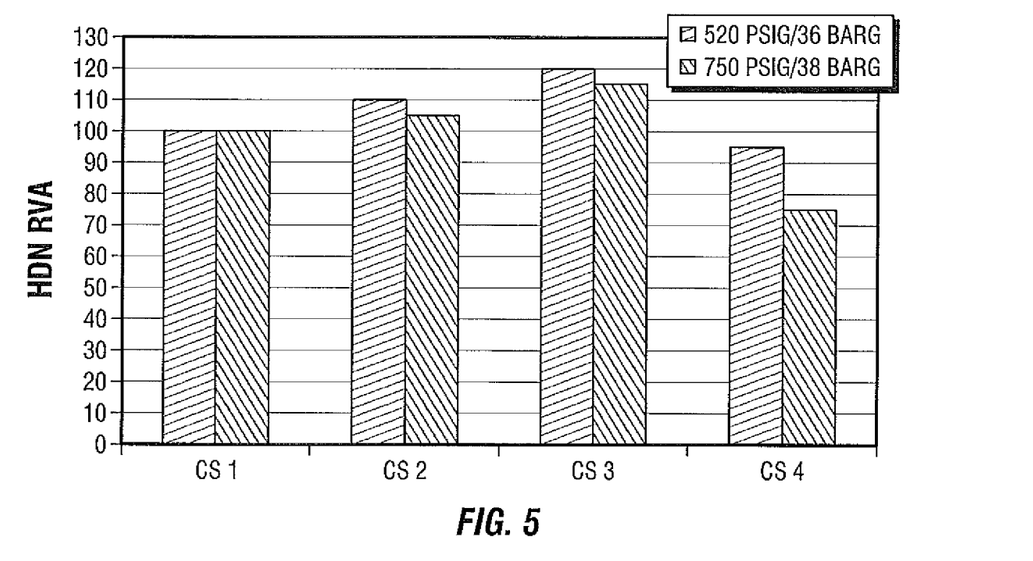
FIG. 5 presents the relative volume deep hydrodenitrogenation (HDN) activity for yielding a diesel product under two different low to moderate pressure reaction conditions for several different stacked catalyst bed reactor systems (CS1, CS2, CS3) and for a single catalyst bed reactor system (CS4).

The HDN RVA activities observed with the four catalyst systems tested are shown in FIG. 5. In general, the NiMo containing systems, i.e., CS1, CS2, and CS3, show higher HDN activity than the CoMo containing system, i.e., CS4, at both pressure levels tested. The higher HDN RVA observed with CS2 when compared with the HDN RVA of CS1 indicates that inventive Catalyst A enhances the HDN capability of the CoMo/NiMo catalyst system. This is consistent with the results observed with direct comparisons of the inventive Catalyst A and comparative Catalyst B. The increased HDN activity of the inventive CS2 and CS3 CoMo/NiMo catalyst systems will be more robust and flexible to feed changes. Incorporating the inventive NiMo Catalyst C into a stacked-bed catalyst system with the inventive CoMo Catalyst A results in the highest catalyst system HDN activity.

EXAMPLE 5

Processing of High Endpoint Feed With Inventive and Comparison Catalysts

This Example 5 presents pilot plant testing results of the performance of the inventive Catalyst A and comparison Catalyst B in the hydrodesulfurization and hydrodenitrogenation of a high endpoint feedstock having significant concentrations of sulfur and nitrogen.

The pilot plant testing discussed in this Example 5 evaluates the performance of the inventive Catalyst A and comparison Catalyst B when used in the processing of a very high endpoint, i.e., a T95 of at least 795° F. (424° C.), SRGO feed. The properties of this feed are shown in Table 7.

TABLE 7

High Endpoint SRGO Feed Properties

| Feed Type | Heavy SRGO |
|---|---|
| Density @ 60 F. (g/cc) | 0.8680 |
| API Gr @ 60 F. | 31.5 |
| Sulfur (wt %) | 1.41 |
| Nitrogen (wppm) | 210 |
| UV Aromatics (wt %) | |
| Mono | 5.10 |
| Di | 3.81 |
| Tri | 1.87 |
| Tetra | 1.29 |
| Poly | 6.97 |
| Total | 12.07 |

| D-2887 Distillation (wt %) | ° F./° C. |
|---|---|
| IBP | 305/152 |
| 5% | 443/228 |
| 10% | 488/253 |
| 30% | 568/298 |
| 50% | 619/326 |
| 70% | 676/358 |
| 90% | 760/404 |
| 95% | 795/424 |
| EP | 861/461 |

The process condition sets, i.e., Set 1, Set 2, and Set 3, used for the high EP feed testing are shown in Table 8. These correspond to the conditions used in typical commercial operations that process this type of high endpoint feed. The results obtained with Catalyst A and Catalyst B, when processing the feed described in Table 7 at the process conditions described in Table 8, are shown in FIG. 6 and FIG. 7.

Figure 6:
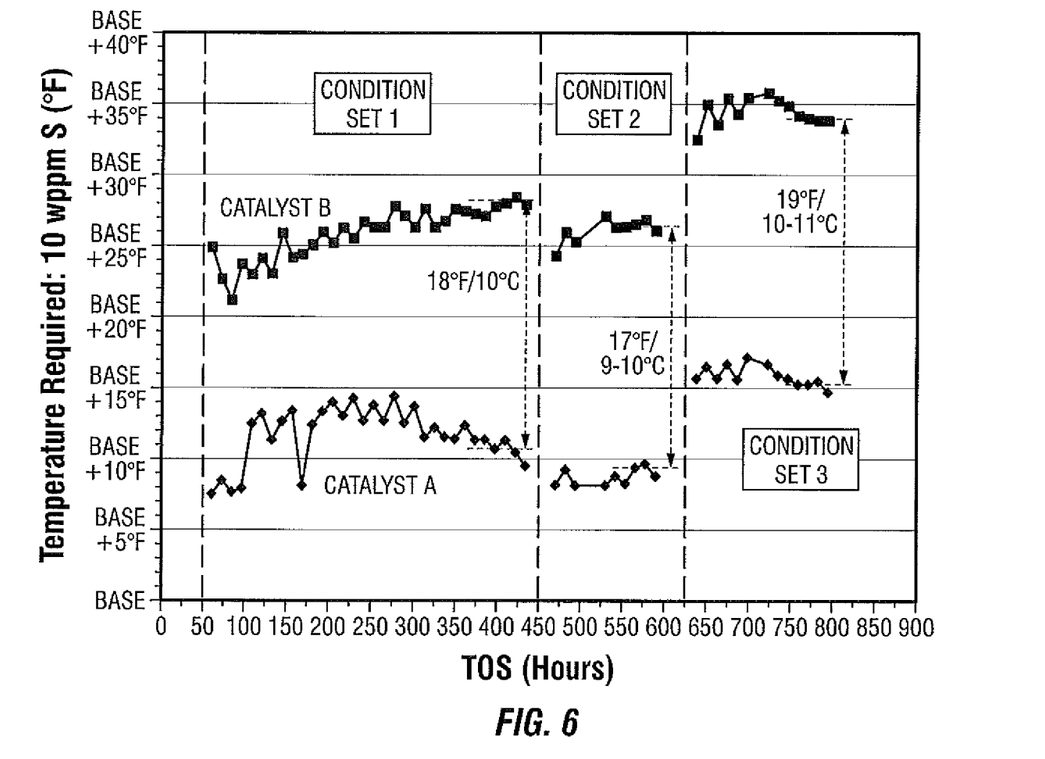
FIG. 6 presents the hydrodesulfurization (HDS) activity, i.e., the required temperature relative to the base catalyst temperature to achieve a 10 ppmw sulfur concentration in the diesel product, in processing a high endpoint straight run gas oil to yield an ultra-low sulfur diesel product as a function of time-on-stream (TOS) for the inventive Co/Mo catalyst composition and for the comparative Co/Mo catalyst. The presented testing results are for three different testing condition sets (Condition Set 1, Condition Set 2, and Condition Set 3).

As is shown in FIG. 6, the inventive Catalyst A has ULSD HDS activity that is 17 to 19° F. (9 to 11° C.) more active than the comparison Catalyst B. This is approximately equal to a 135 to 140 ULSD HDS RVA for Catalyst A as compared to a 100 ULSD HDS RVA for Catalyst B.

Figure 7:
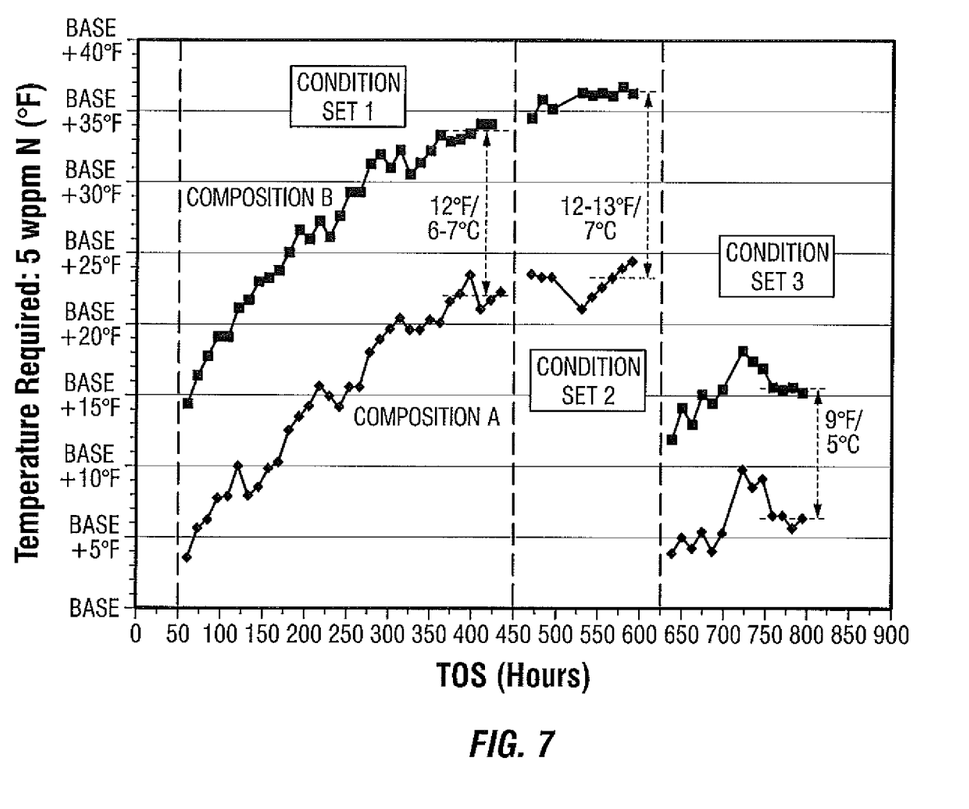
FIG. 7 presents the hydrodenitrogenation (HDN) activity, i.e., the required temperature relative to the base catalyst temperature to achieve a 5 ppmw nitrogen content in the diesel product, in processing a high endpoint straight run gas oil to yield an ultra-low sulfur diesel product as a function of time-on-stream (TOS) for the inventive Co/Mo catalyst composition and for the comparative Co/Mo catalyst. The presented testing results are for three different testing condition sets (Condition Set 1, Condition Set 2, and Condition Set 3).

FIG. 7 shows a 9 to 13° F. (5 to 7° C.) HDN activity advantage for Catalyst A. This translates into an HDN RVA of from 120 to 125 for Catalyst A as compared with an HDN RVA of 100 for Catalyst B. The improved ULSD HDS performance of Catalyst A can be in part attributed to its superior HDN activity. The ULSD HDS and HDN activity stabilities of Catalyst A are equivalent to that of Catalyst B.

TABLE 8

High Feed Endpoint Pilot Plant Test Process Conditions

| | Condition Set 1 | Condition Set 2 | Condition Set 3 |
|---|---|---|---|
| Pressure (psig/barg) | 655/45 | 655/45 | 910/63 |
| LHSV (hr$^{-1}$) | 0.64 | 0.61 | 0.90 |
| H$_2$/Oil (SCFB/Nm$^3$/m$^3$) | 2030/340 | 1805/300 | 2085/350 |
| Target S (wppm) | 10 | 10 | 10 |

The H$_2$ consumption data obtained with the high EP feed testing indicate that, at start-of-run conditions and equivalent product sulfur levels, the H$_2$ consumption with Catalyst A was 95 to 100% of that observed with Catalyst B. The equivalent or lower start-of-run H$_2$ consumption with Catalyst A is due to the large reduction in the start-of-run to temperature requirements (17-19° F./9-11° C.) required to meet the target sulfur level with the catalyst. This results in a start-of-run operating temperature requirement being in a temperature region where the rate of aromatics saturation is reduced.

It will be apparent to one of ordinary skill in the art that many changes and modifications may be made to the invention without departing from its spirit and scope as set forth herein.

That which is claimed is:

1. A hydroprocessing catalyst composition, wherein said hydroprocessing catalyst composition, comprises: a support material that is loaded with active metal components including a cobalt or nickel component, a molybdenum component, and a phosphorous component, and having been dried but not calcined, wherein at least 75% of its pore volume is filled with an additive consisting essentially of a heterocyclic additive, wherein said heterocyclic additive is a heterocyclic, polar compound of the formula $C_xH_aN_yO_z$, wherein x is an integer of 3 or larger; y is either 0, 1, 2 or 3; z is either 0, 1, 2 or 3; and n is the number of hydrogen atoms required to fill the remaining bonds with the carbon atoms of the molecule, and further, said heterocyclic, polar compound is selected from the group consisting of cyclic ether compounds and cyclic ester compounds.

2. A catalyst composition as recited in claim 1, wherein said catalyst composition further comprises a material absence of a hydrocarbon oil.

3. A catalyst composition as recited in claim 1, wherein said support material is further thereafter treated with a gas comprising hydrogen.

4. A catalyst composition as recited in claim 1, wherein the additive is propylene carbonate.

5. A catalyst composition as recited in claim 1, wherein said cobalt or nickel component is present in said composition in an amount in the range of from 0.5 wt. % to 20 wt. %, and wherein said molybdenum component is present in said composition in an amount in the range of from 5 wt. % to 50 wt. %.

6. A method of making hydroprocessing catalyst composition, wherein said method comprises:
    incorporating a metal-containing solution, comprising a cobalt or nickel component, a molybdenum component, and a phosphorous component, into a support material to provide a metal-incorporated support material;
    drying said metal-incorporated support material to provide a dried metal-impregnated support material; and
    filling at least 75% of the pore volume of said dried metal-impregnated support material with an additive consisting essentially of a heterocyclic compound additive selected from the group consisting of cyclic ether compounds and cyclic ester compounds of the formula $C_xH_aN_yO_z$, wherein x is an integer of 3 or larger; y is either 0, 1, 2 or 3; z is either 0, 1, 2 or 3; and n is the number of hydrogen atoms required to fill the remaining bonds with the carbon atoms of the molecule, to thereby provide an additive-impregnated composition.

7. A method as recited in claim 6, further comprising: contacting said additive-impregnated composition under suitable hydrogen treatment conditions with hydrogen to thereby provide a hydrogen-treated composition.

8. A method as recited in claim 7, wherein said dried metal-incorporated support material has a volatiles content in the range of from 3 to 20 wt. % LOI.

9. A method as recited in claim 8, wherein said cobalt or nickel component is present in said composition in an amount in the range of from 0.5 wt. % to 20 wt. %, and wherein said molybdenum component is present in said composition in an amount in the range of from 5 wt. % to 50 wt. %.

10. A composition made by the method of claim 6.

11. A process for hydrotreating a hydrocarbon feedstock, wherein said process comprises:
    contacting under suitable hydrotreating process conditions said hydrocarbon feedstock with the catalyst composition recited in claim 1; and yielding a treated product.

* * * * *